United States Patent [19]
Suzuki et al.

[11] Patent Number: 5,829,403
[45] Date of Patent: Nov. 3, 1998

[54] MULTI-CYLINDER ENGINE INTAKE MANIFOLD AND INTAKE CONTROL UNIT USING THE INTAKE MANIFOLD

[75] Inventors: Isamu Suzuki; Makoto Fujimori, both of Obu, Japan

[73] Assignee: Aisan Industry Co., Ltd., Obu, Japan

[21] Appl. No.: 909,055

[22] Filed: Aug. 11, 1997

[30] Foreign Application Priority Data

Sep. 13, 1996 [JP] Japan ................................ 8-242849

[51] Int. Cl.⁶ .................................................. F02M 35/10
[52] U.S. Cl. ..................................................... 123/184.55
[58] Field of Search ........................ 123/184.55, 184.61, 123/184.53

[56] References Cited

U.S. PATENT DOCUMENTS

| | | | |
|---|---|---|---|
| 4,590,895 | 5/1986 | Yada et al. | 123/393 |
| 4,619,226 | 10/1986 | Ueda et al. | 123/432 |
| 4,726,329 | 2/1988 | Atkin | 123/184.55 |
| 4,854,270 | 8/1989 | Melde-Tuczai et al. | 123/184.55 |
| 4,858,568 | 8/1989 | Obayashi et al. | 123/184.55 |
| 4,932,369 | 6/1990 | Parr | 123/184.55 |
| 5,156,117 | 10/1992 | Müller et al. | 123/184.31 |
| 5,546,900 | 8/1996 | Adamek et al. | 123/184.55 |
| 5,709,182 | 1/1998 | Espe et al. | 123/184.55 |

FOREIGN PATENT DOCUMENTS

| | | |
|---|---|---|
| A-747584 | 12/1996 | European Pat. Off. . |
| 3825000 | 2/1989 | Germany ............... 123/184.55 |
| 3740403 | 6/1989 | Germany ............... 123/184.55 |
| 532866 | 2/1958 | Italy ..................... 123/184.55 |
| A-59-188027 | 10/1984 | Japan . |
| A-60-19914 | 2/1985 | Japan . |
| A-60-138223 | 7/1985 | Japan . |
| A-60-142013 | 7/1985 | Japan . |
| A-60-216028 | 10/1985 | Japan . |
| A-60-216029 | 10/1985 | Japan . |
| A-60-216064 | 10/1985 | Japan . |
| A-60-224922 | 11/1985 | Japan . |

*Primary Examiner*—David A. Okonsky
*Attorney, Agent, or Firm*—Oliff & Berridge, PLC

[57] ABSTRACT

An intake manifold providing a plurality of manifold passages, for supplying air toward engine cylinders arranged on a periphery of a pipe member, in the same number of engine cylinders in an axial direction, of which a plurality of intake passage inlets are opened on a pipe wall of the pipe member for delivering the air from the inside of the pipe member to the manifold passages, and a plurality of intake passages formed by rounding the each manifold passage of each engine cylinder being adjacent to the axial direction of the pipe member, and arranged by connecting in series.

18 Claims, 6 Drawing Sheets

MULTI-CYLINDER ENGINE INTAKE MANIFOLD AND INTAKE CONTROL UNIT USING THE INTAKE MANIFOLD

BACKGROUND OF THE INVENTION

1. Field of the Invention

The present invention relates to internal combustion engines, and particularly relates to an intake manifold for multi-cylinder engines and an intake control unit utilizing the intake manifold.

2. Description of Related Art

Utilizing the so-called intake internal effect is an effective technique for improving performance in automotive internal combustion engines by increasing the air intake efficiency. The length of the intake passage, at which maximum effect is obtained, becomes shorter as engine speed increases.

An intake control unit is publicly known in the conventional art in Japanese Laid Open Patent 60-216064. In the intake control unit, a cylindrical rotary valve to be rotated according to the number of engine speed is provided. Spiral-shaped intake passage surrounding a periphery of the rotary valve in a direction of circumference are provided in the same number of engine cylinders in an axial direction of the rotary valve so as to distribute the required air for combustion into each intake passage.

The spiral intake passage in the same number of the engine cylinders are formed by a casing surrounding the periphery of the rotary valve. Angle positions of connecting holes are changed by rotating the rotary valve so that the connecting holes of the rotary valve, which are provided in the same number of the spiral intake passage, can be changed. Also, the length of the intake passage between the connecting holes and valve ports of engine cylinders, in other word, the actual length of the intake passage related to the intake internal effect can be changed.

Branch pipes, which are connected with a downstream of spiral intake passage of casing, are integrated with the casing, thereby the downstream heads of branch pipes are actually connected with an engine head.

As a result, the length of these branch pipes are included in the actual length of the intake passage.

However, in the conventional technology of the related art, such a spiral intake passage is provided with a casing, therefore, it results in a disadvantage that the vehicular load may be inadequate in proportion as outward shape of casing getting larger by trying to get the length of spiral intake passage longer in order to use effectively the intake internal effect until a rotating range that the rotation number of engine is low.

Further, since an intake manifold is integrated with a casing which has a plurality of spiral intake passages and a plurality of branch pipes, it has been strongly required for using a single piece manufactured by a core molten molding in order to manufacture the intake manifold. Especially when the intake manifold is resinificated in order to achieve a light-weight of vehicular load, this sort of requirement is ordered.

However, the core molten molding needed for complicate manufacturing process like producing the core or the core molten process after molding, also it has another disadvantage of difficulty of producing the core.

SUMMARY OF THE INVENTION

An object of the invention is to overcome problems described above and to provide an intake manifold for multi-cylinder engines, an intake control unit using the intake manifold which is capable that resolves the above mentioned problems.

To achieve the objects and in accordance with the purpose of the invention, an intake manifold comprises a plurality of manifold passages for supplying air toward engine cylinders arranged on a periphery of a pipe member in same numbers of engine cylinders in an axial direction, of which a plurality of intake passage inlets are opened on a pipe wall of the pipe member for delivering the air from the inside of the pipe member to the manifold passages, and a plurality of intake passages formed by rounding the each manifold passage of each engine cylinder being adjacent to the axial direction of the pipe member, and arranged by connecting in series.

Also, in another aspect of the present invention, an intake manifold comprises an outer pipe, an inner pipe fit-inserted into the outer pipe and having a surge tank inside, a manifold intake passage surrounded-formed plurally between the outer pipe and the inner pipe corresponding to each cylinder of a multi-cylinder engine, a rotary valve provided inside the inner pipe, a first intake passage inlet provided on a wall surface of the inner pipe for delivering air from the surge tank into a upstream part of the manifold intake passage, a second intake passage inlet provided on the surface of the inner pipe for delivering the air from the surge tank into a downstream part of the manifold intake passage, a first connecting hole on the rotary valve for delivering the air from the surge tank into the manifold intake passage through the first intake passage inlet at a low-speed rotation of engine, and a second connecting hole for delivering the air from the surge tank into the manifold intake passage through the second intake passage inlet at a high-speed rotation of engine, so that an actual length of the manifold intake passage may be adjustable according to a rotation speed of engine.

Further, in another aspect of the present invention, an intake control unit using the intake manifold comprises an outer pipe, an inner pipe fit-inserted into the outer pipe and having a surge tank inside, a plurality of manifold intake passages surrounded-formed plurality between the outer pipe and the inner pipe, the manifold intake passages being provided in an axial direction in the same number of cylinder of a multi-cylinder engine and branch pipes being connected with each cylinder at outlets of each manifold intake passage, a rotary valve provided inside the inner pipe, a first intake passage inlet on the wall surface of the inner pipe for delivering air from the surge tank into a upstream of the manifold inlet passage, a second intake passage inlet for delivering air from the surge tank into a downstream of the manifold intake passage, a first connecting hole on the rotary valve for delivering air from the surge tank into the manifold intake passage through the first intake passage inlet at a low-speed of engine, and a second connecting hole for delivering air from the surge tank into the manifold intake passage through the second intake passage inlet, so that an actual length of the manifold intake passage may be adjustable according to a rotation speed of engine.

The intake manifold and the intake control unit of this invention are constructed as described above, therefore, the dimensions of the outward shape may be smaller, and by adding the number of turns in the axial direction, the compact and substantial length of the intake passage can be longer without making the dimensions of the outward shape larger. As a result of this, the intake internal effect of the range of from the low-speed rotation upto the high-speed rotation can be improved, and an engine output also can be improved.

Further, in accordance with the number of rotations, it is easy to be structured that the substantial length of the intake passage can be changed step-by-step.

In addition, the manufacturing process is not complicated because the core molten molding is not used.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention.

In the drawings,

FIG. 3 A is an enlarged vertical section of a portion of an inner pipe in a segmentary view of FIG. 1, and FIG. 3B is an enlarged vertical section view showing a portion of assembly parts that the inner pipe is fit-inserted into an outer pipe and a pipe cover is fitted on;

DETAILED DESCRIPTION OF THE PREFERRED EMBODIMENTS

A detailed description embodied by the present invention is provided below with reference to the accompanying drawings.

First Embodiment

Figure 1:
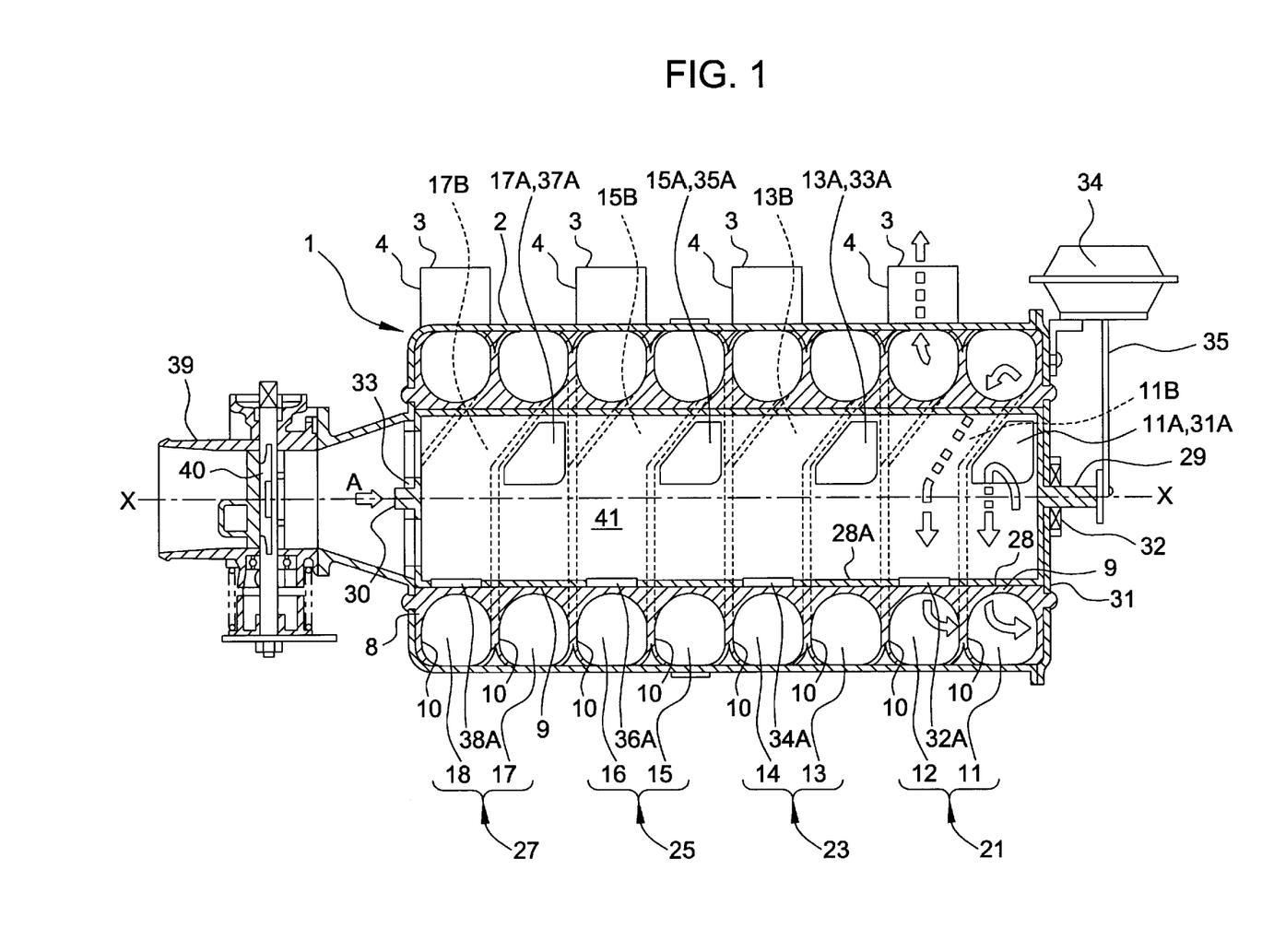
FIG. 1 is a vertical cross sectional view in the first preferred embodiment of the present invention.
Figure 2:
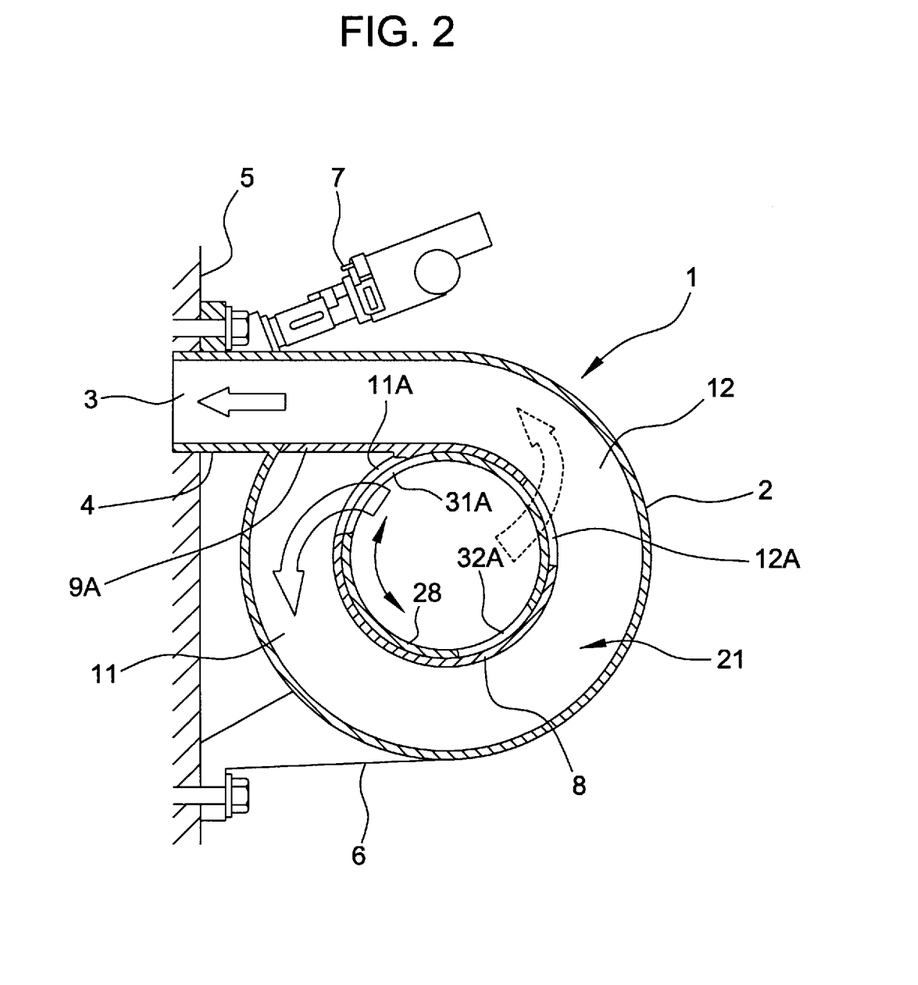
FIG. 2 is a schematic view showing a reference view of a transverse cross section in the embodiment of FIG. 1.

In FIG. 1 through FIG. 4, an outer pipe 1 having a circular cylindrical part 2 is made of resin-molding product. On the outer pipe 1, four branch pipes 4, which form intake outlets 3 connected with a gap inside the cylindrical part 2, are arranged in the same number engine cylinders in an axial X—X direction of the outer pipe 1. Also, a bracket 6 is integrated on the periphery of the cylindrical part 2 so as to fix the branch pipes 4 and the outer pipe 1 with an engine 5 by using bolts as shown in FIG. 2.

A fuel injector 7 is provided for every branch pipe 4. An inner pipe 8 made of resin-molding product has cylindrical parts 9, fin-shaped diaphragms 10 extending outside in radius direction, and cut-off walls 9A extending in a tangential direction of circumference from the cylindrical part 9 opposed to the manifold outlet 3.

Figure 3A:
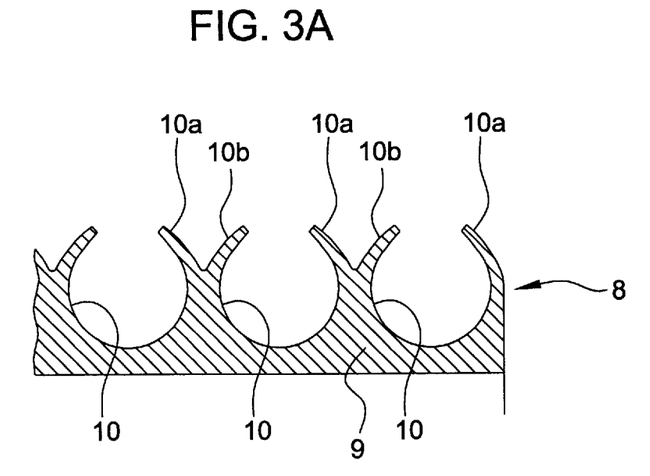
Figure 3B:
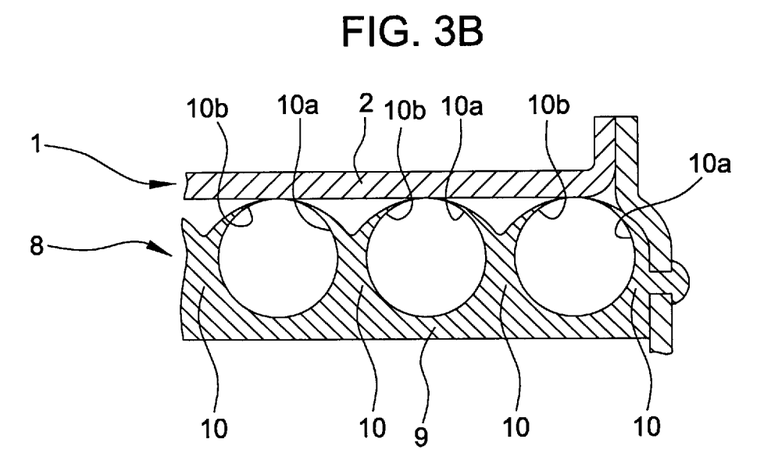

Under the condition of a single piece of the inner pipe, 8 before assembling with the outer pipe 1, as shown in FIG. 3A, tip parts 10a and 10b of the diaphragms 10 extended in the radius direction. On the other hand, under the condition that the inner pipe 8 is inserted into the cylindrical part 2 of the outer pipe 1, the tip parts 10a and 10b are pushed into the internal circumference of the cylindrical part 2 and are curved with elastic deformation so as to be put congruously into the inside of the outer pipe 1 as shown in FIG. 1 and FIG. 3B.

By the above-mentioned process, combinations of the inner pipe 8 are fixed into the outer pipe 1, and loop the circumference of the cylindrical part 9 having approximately circular section for a round angle of the circumference in the direction of circumference. Also, the combinations are formed adjacently in the direction X—X of axial line, and intake connecting passages 11B, 13B, 15B and 17B, which connect the downstream parts of the intake passages 11, 13, 15 and 17 with the upstream parts of the intake passages 12, 14, 16 and 18, are formed obliquely on the periphery of the cylindrical part 9.

Four of the branch pipes 4 are provided so that the intake outlets 3 are connected with the downstream parts of the intake passage 12, 14, 16 and 18. Also, the cut-off wall 9A extends from the cylindrical part 9 of the inner pipe 8 in the tangential direction for smoothly leading the downstream parts of the intake passages 12, 14, 16 and 18 to the branch pipes 4, and the cut-off wall 9A is a part of the passage for being connected with the passage of the branch pipe 4.

First intake passage inlets 11A, 13A, 15A and 17A are passed through the cylindrical part 9 of the inner pipe 8 in the radial direction to be connected with the upstream parts of the intake passages 11, 13, 15 and 17.

Figure 4:
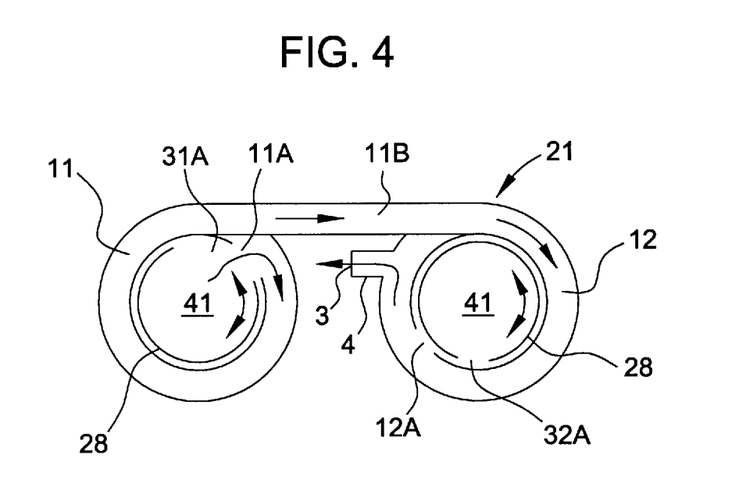
FIG. 4 is a scheme explaining an intake flow in the first preferred embodiment of the present invention shown in FIGS. 1 to 3.

As a result, the first intake connecting passage inlet 11A, intake passage 11B, intake passage 12 and intake passage outlet 3 are connected in order, thereby the first intake passage 21 is constructed. On the slight upperstream part away from the downstream head (the intake outlet 3) of the intake passage 12, a second intake passage inlet 12A is passed though the cylindrical part 9 in the radial direction as shown in FIG. 4.

In the same way, on the slight upperstream part away from the downstream head of the intake passages 14, 16 and 18, second intake passage inlets 14A, 16A and 18A are respectively provided (not illustrated).

By the above-mentioned structure, the first though fourth intake passages 21, 23, 25 and 27, each corresponding to an engine cylinder, are provided.

The first intake passage 21 is structured by a series connection of the passage 11, the connecting passage 11B, the passage 12 and the intake passage outlet 3 of the branch pipe 4. Also, the first intake passage inlet 11A is provided on the upstream part of the intake passage 11, and the second intake passage inlet 12A is provided slightly on the upperstream part away from the downstream head of the intake passage 12.

The second intake passage 23 is structured by a series connection of the passage 13, the connecting passage 13B, the passage 14 and the intake passage outlet 3 of the branch pipe 4. Also, the first intake passage inlet 13A is provided at the upstream part of the intake passage 13, and the second intake passage inlet 14A is provided slightly at the upperstream part away from the downstream head of the intake passage 14.

The third intake passage 25 is structured by a series connection of the passage 15, the connecting passage 15B, the passage 16 and the intake passage outlet 3 of the branch pipe 4. Also, the first intake passage inlet 15A is provided on the upstream part of the intake passage 15, and the second intake passage inlet 16A is provided slightly on the upperstream part away from the downstream head of the intake passage 16.

The fourth intake passage 27 is structured by a series connection of the passage 17, the connecting passage 17B, the passage 18 and the intake passage outlet 3 of the branch pipe 4. Also, the first intake passage inlet 17A is provided at the upstream part of the intake passage 17, and the second intake passage inlet 18A is provided slightly at the upperstream part away from the downstream head of the intake passage 18.

Although the intake passage inlets 14A, 16A and 18A are not illustrated in the figures, as shown in FIG. 2 and FIG. 4 the second intake inlet 12A is provided at the intake passage 12 in the first intake passage 21. In the same way, the second intake passages 14A, 16A and 18A are provided slightly at the upperstream part away from the downstream head of the intake passage 14, 16 and 18. The second passage inlets are adjustable for setting positions inside the passages as occasional demands.

A cylindrical rotary valve 28 with partially having the bottom is loosely inserted into the inside of the inner pipe 8 coaxially. A shaft 29 is provided at the center of the bottom of the valve 28 (as shown in the right side of the FIG. 1) and a shaft 30 at the left side of FIG. 1, thereby the shafts are born by a bearing 32 fixed with a head plate 31 and a bearing part 33 on the left side of FIG. 1.

A diaphragm actuator 34 is operated based on a control signal of a computer by the depression of engine manifold caused by the rotation of engine, so that the rotary valve 28 is rotated by driving the shaft 29 through a connecting mechanism 35.

The rotary valve 28 comprises first intake outlets 31A, 33A, 35A and 37A corresponding to the first intake inlet 11A, 13A, 15A and 17A provided at the passage 11, 13, 15 and 17 of the intake passage 21, 23, 25 and 27 at its cylindrical part, and also the intake outlets 32A, 34A, 36A and 38A; are opposite from the first intake passage inlets 11A, 13A, 15A and 17A at the low-speed rotation of engine.

Simultaneously, the second intake passage inlet 12A, 14A, 16A and 18A provided at the passage 12, 14, 16 and 18 are closed by a cylindrical part 28A of the rotary valve 28.

The rotary valve 28 further comprises second intake outlets 32A, 34A, 36A and 38A corresponding to the second intake passage inlets 12A, 14A, 16A and 18A provided at the passages 12, 14, 16 and 18 of the intake passages 21, 23, 25 and 27 at its cylindrical part and also the intake outlets 31A, 33A, 35A and 37A; are opposite from the second intake passage inlets 12A, 14A, 16A and 18A at the high-speed rotation of engine. Since 34A, 36A, 38A have the same structure as the above-mentioned description of 32A they are not illustrated herein.

A throttle body 39, which is fixed with the upstream edge of the outer pipe 1 (as shown in the left side of FIG.1), has a throttle valve 40. A surge tank 41 is provided inside the rotary valve 28.

Next, the operating method of the first preferred embodiment of the above-mentioned structure will be described herein.

At the low-speed rotation of engine, the angle of rotary valve 28 is positioned as shown in FIG. 1. The first intake outlets 31A, 33A, 35A and 37A are respectively opposite from the intake passage inlets 11A, 13A, 15A and 17A of the inner pipe 8 (the passages 11, 13, 15 and 17).

As a result of this, the intake air through the throttle body 39 flows like an arrow A into the surge tank 41. The intake air flows from the first intake outlet 31A, 33A, 35A and 37A through the first intake passage inlet 11A, 13A, 15A and 17A. Afterward, the air flows through the first to the fourth intake passages 21, 23, 25 and 27, thereby the air flows from each intake passage outlet 3 toward engine cylinders (not illustrated).

Therefore, the actual length of the intake passage involving with the intake internal effect at the low-speed rotation become much longer, because the length is regarded as between the first intake outlets 31A, 33A, 35A and 37A upto the intake port of engine cylinders which is not illustrated in FIG. 1.

At the high-speed rotation of engine, as shown in FIG. 2, the rotary valve 28 is rotated counter-clockwise by the diaphragm actuator 34. In FIG. 4, the rotary valve 28 is rotated clockwise, so that the second intake outlet 32A is driven until it come to the opposite position to the first intake passage inlet 12A. Under this situation, other second valves 34A, 36A, and 38A may be opposite from the second intake passage inlets 14A, 16A and 18A, so that the actual length of the intake passage involving with the intake internal effect becomes much shorter, because the length is regarded as from the second intake outlets 32A, 34A, 36A and 38A upto the intake port of engine cylinders (not illustrated).

As described above, at the low-speed rotation of engine, the accurate length of the intake passages 21, 23, 25 and 27 involving with the intake internal effect may have the length of approximate two rounds surrounding the rotary valve 28 in the direction of circumference.

Therefore, it is a longer size as compared with the outward dimension of the outer pipe. As a result of this, the low-speed rotation can be achieved by using the intake internal effect which is useful for improving engine output, and the compactness of intake manifold can be achieved as well.

The intake passages 21, 23, 25 and 27 have not only oblique parts of the intake connecting passages 11B, 13B, 15B and 17B but also helical-shape part every each intake passage.

Figure 5:
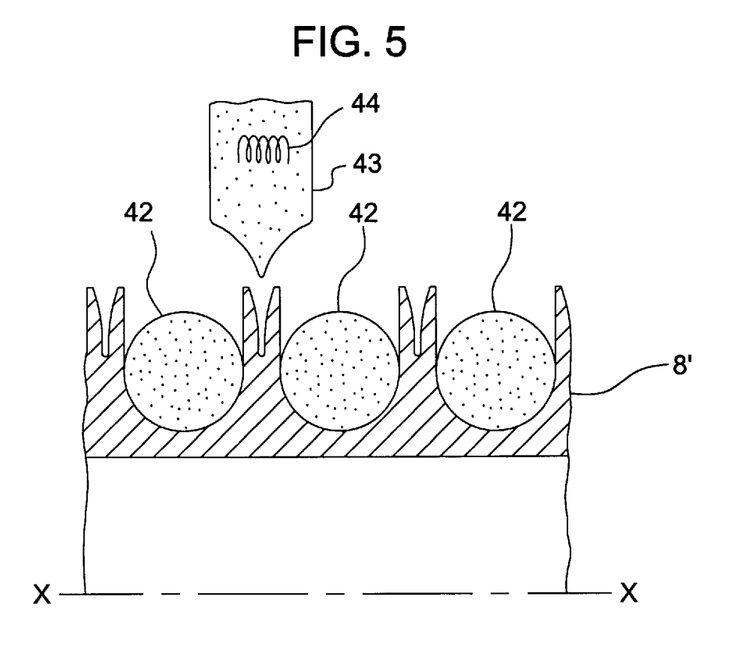
FIG. 5 is a section view explaining a manufacturing method of the inner pipe for use in the first embodiment of the present invention.

Incidentally, in order to mold the inner pipe 8 by resin in the first preferred embodiment, after the inner pipe 8 is molded by a split mold as a shape of reference numeral 8' in FIG. 5, by using jigs 42 and 43, with the jig 43 heated by a heater 44, the jig 43 is pressed down and put between the tip part 10*a* and 10*b* of the diaphragm 10 so as to deform the both tips by heat. Consequently, by molding them like the shapes shown in FIG. 3 A, the inner pipe 8 can be produced without using any core molten moldings.

FIG. 2 shows that the intake air from the intake passage inlet 11A through the passage 11 flows round the rotary valve 8 so as to come out from the intake passage outlet. Although it seems that the passage 11, 12 and the outlet 3 are illustrated in the same section in FIG. 2, actually, the air goes two rounds and comes out from the outlet. Therefore, the descriptions of FIG. 1 and FIG. 4 are more accurate.

Also, by adding the intake inlets and outlets of manifold passage and intake inlets and outlets of rotary valve, or adding two or three more sets of the preferred embodiment, it may be possible that the rotary valve enables to be rotated and changed-over by the diaphragm actuator.

Second Embodiment

Figure 6:
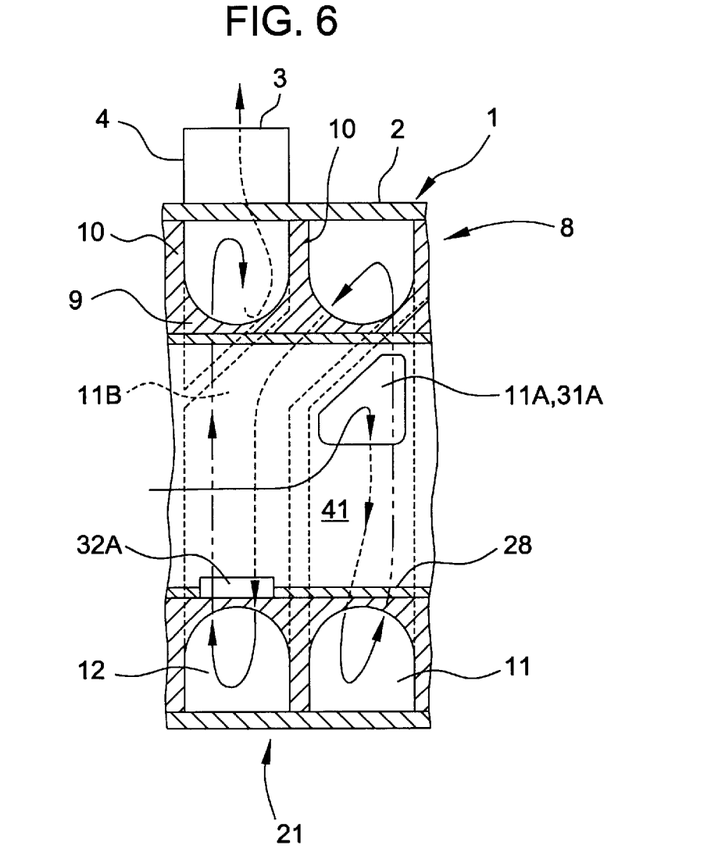
FIG. 6 is an enlarged view of detailed vertical section in the second preferred embodiment of the present invention.

The preferred embodiment of FIG. 6 is different from the first preferred embodiment in the point that the tip parts of the diaphragm 10 are formed not like forked-shapes but like one piece of a fin-shaped plate. However, since the whole operation is same as the preferred embodiment, the detailed description will be omitted.

Third Embodiment

Figure 7:
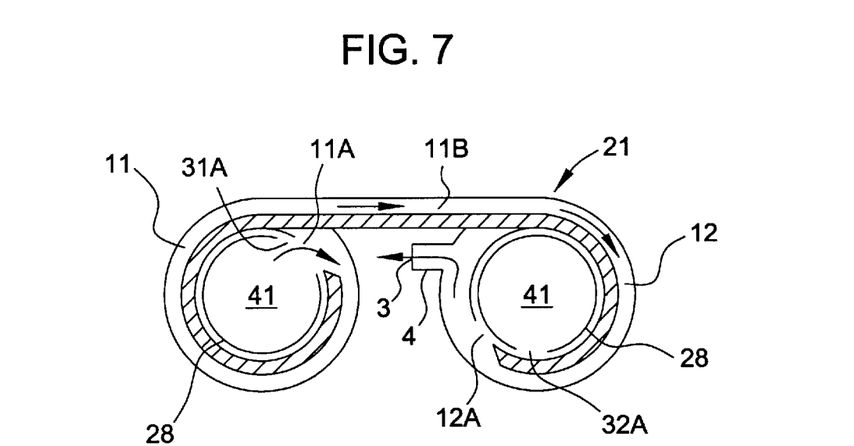
FIG. 7 is a scheme explaining a structure of intake passage and its intake flow in the third preferred embodiment of the present invention.

In this preferred embodiment, at the high-speed rotation, the cross section dimensions of the intake passage may become large and the intake internal effect may be improved by the cross section dimensions of passage corresponding to a large amount of air capacity necessary for the high-speed rotation. On the other hand, at the low-speed rotation, the cross section dimension may be small corresponding to a small amount of air capacity so that the air flow speed and the intake internal effect can be improved so as to increase the intake air capacity.

FIG. 7 is a scheme showing a structure of the third preferred embodiment. The first intake passage 21 consists of passage 11, connecting passage 11B and passage 12. By the second intake passage inlet 12A for using at the high-speed rotation, the length of the intake passage 12 at the downstream upto the intake outlet 3, in other words, the actual length of the intake passage 12 involved with the intake internal effect, is to be shorten, so that the passage part of the downstream is thicken. Also, the cross section dimensions of the passage part of the upstream (a part of passage 12), the connecting passage 11B and the passage 12 are set smaller than of the first preferred embodiment.

Other intake passages 23, 25 and 27 are same as the abovementioned structure.

Fourth Embodiment

The above-mentioned preferred embodiments provide the intake control unit device for an object of the present invention that the rotary valve 28 is driven according to the number of rotations of engine so as to change-over the actual length of intake passage. However, when the intake control unit device is applied for engine which is not necessary to change-over the length of intake passage, the rotary valve 28 or the diaphragm actuator for driving are unnecessary, neither are the intake passage inlets 12A, 14A, 16A and 18A.

As a result of this, the structured parts of intake manifold can be shared with other parts of the preferred embodiments, or other similar parts are available as well, so it may be useful to share each part in case of producing many various types of intake manifolds or intake control unit.

Figure 8:
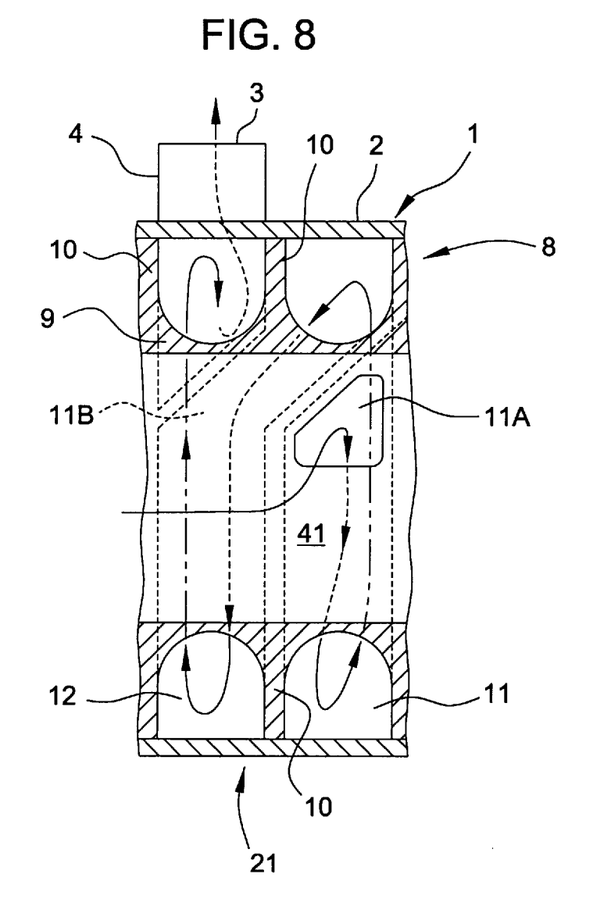
FIG. 8 is an enlarged view of detailed vertical section in the fourth preferred embodiment of the present invention.
Figure 9:
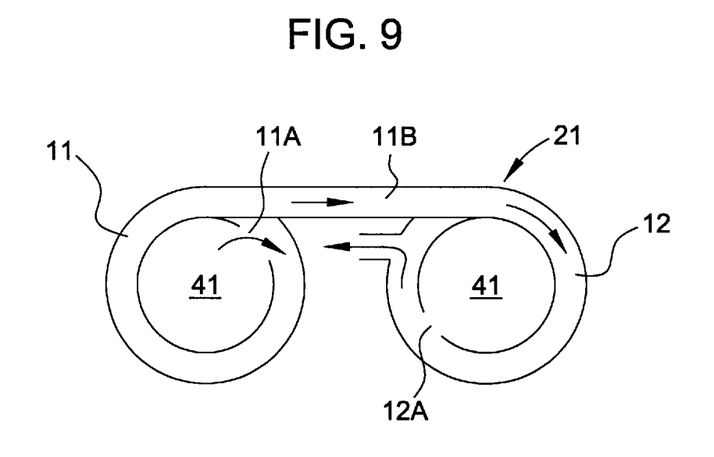
FIG. 9 is a scheme explaining the intake flow in the embodiment of FIG. 8.

FIG. 8 shows the detailed part of the present preferred embodiment and FIG. 9 shows a scheme of the air flowing in the intake passage 21. The detailed structure and functions of the present preferred embodiment may be understandable by the explanation of the above-mentioned preferred embodiments.

In the preferred embodiments of FIG. 8 and 9, the inner pipe 8 made of synthetic resin is fit-inserted into the inside of the cylindrical part 2 of the outer pipe 1 made of synthetic resin. There are a plurality of fin-shaped diaphragms 10 extending in the diametrical direction of outer wall of the cylindrical part 9 of the inner pipe 8. By the diaphragm 10 and the outer pipe 1, spiral manifold intake passage 11–12, 13–14, 15–16, and 17–18 are provided corresponding to each engine cylinder. Although on the wall surface of the inner pipe 8, it is only that the first intake passage inlet 11A is formed at the first intake passage 11, and the second intake passage inlet 12A is formed at the second intake passage 12, the rotary valve 28 is not provided therein.

From the comparison with the scheme as shown in FIG. 4, since the difference of the preferred embodiment is with the rotary valve 28 or without the rotary valve 28, the other structures are the same. Therefore, when the intake manifold is assembled, the different point is only whether the rotary valve 28 is fixed or not. The interchangeability of other parts are provided therein.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An intake manifold, comprising:
    a plurality of manifold passages for supplying air toward an equal number of engine cylinders, the plurality of manifold passages arranged on a periphery of a pipe member in a one-to-one manifold passage relationship to an engine cylinder with the plurality of manifold passages arranged in an axial direction, an intake passage inlet is opened on a pipe wall of said pipe member for delivering the air from the inside of said pipe member to each said manifold passage; and
    a plurality of intake passages, each intake passage formed by rounding said each manifold passage, for each said engine cylinder around said pipe member, being adjacent to one another along the axial direction of said pipe member, said each manifold passage having at least two helically rounded intake passages connecting in series.

2. The intake manifold according to claim 1, wherein a downstream intake passage of said each manifold passage has larger vent sectional dimensions than the vent sectional dimensions of an upstream intake passage.

3. The intake manifold according to claim 1, wherein the pipe member comprises an outer pipe having a circular cylindrical part and an inner pipe having a fin-shaped diaphragm formed on a periphery of a circular tubular part, the plurality of manifold passages formed by inserting said inner pipe into said outer pipe.

4. The intake manifold according to claim 1, further comprising a cylindrical rotary valve rotationally mounted inside said inner pipe, whereby an actual length of each manifold passage is adjusted by a rotation of said rotary valve.

5. The intake manifold according to claim 4, wherein said each manifold passage has a thicker passage part downstream than upstream because the actual length of said each manifold passage being using is shorter.

6. An intake manifold, comprising:
    an outer pipe,
    an inner pipe fit-inserted into said outer pipe and having a surge tank inside;
    a manifold intake passage surrounded-formed plurally between said outer pipe and said inner pipe corresponding to each cylinder of a multi-cylinder engine;
    a rotary valve provided inside said inner pipe;
    a first intake passage inlet provided on a wall surface of said inner pipe for delivering air from said surge tank into an upstream part of said manifold intake passage;

a second intake passage inlet provided on the surface of said inner pipe for delivering the air from said surge tank into a downstream part of said manifold intake passage;

a first connecting hole on said rotary valve for delivering the air from said surge tank into said manifold intake passage through said first intake passage inlet at a low-speed rotation of engine; and a second connecting hole for delivering the air from said surge tank into said manifold intake passage through said second intake passage inlet at a high-speed rotation of engine, so that an actual length of said manifold intake passage may be adjustable according to a rotation speed of engine, wherein said manifold intake passage between said outer pipe and said inner pipe is formed by at least two rounds of the manifold intake passage around said inner pipe.

7. The intake manifold according to claim 6, wherein a downstream portion of said manifold intake passage has a larger air vent cross sectional dimension than an air vent cross sectional dimension of an upstream portion.

8. The intake manifold according to claim 6, wherein the manifold intake passage is partitioned by a cutoff wall which winds helically on the outer circumference of the inner pipe and contacts the outer pipe to form the at least two intake passages.

9. The intake manifold according to claim 8, wherein the cutoff wall has a fin shape at a portion contacting the outer pipe.

10. The intake manifold according to claim 6, wherein said manifold intake passage is partitioned and formed by cutoff walls which wind helically on the periphery of said inner pipe and are enclosed by said outer pipe.

11. The intake manifold according to claim 10, wherein said cutoff walls are integrated with said inner pipe and formed of a synthetic resin.

12. The intake manifold according to claim 11, wherein tips of said cutoff walls are structured by forked branch walls.

13. The intake manifold according to claim 11, wherein said cutoff walls are formed in a fin shape on the periphery of said inner pipe.

14. An intake manifold having a manifold intake passage for each cylinder of an engine, comprising:

an outer pipe;

an inner pipe mounted within said outer pipe;

a rotary valve rotatably mounted in the inner pipe and having a surge tank interiorly of the rotary valve, wherein each manifold intake passage lies between the outer pipe and the inner pipe and comprises:

at least one intake inlet for delivering air from the surge tank;

at least two intake passages helically wound around the inner pipe for passing the air received from the intake inlet; and an intake outlet for delivering the air to the engine cylinder, the manifold passages for the cylinders adjacent to one another in an axial direction of the inner pipe.

15. The intake manifold according to claim 14, wherein the at least two intake passages are serially connected and side-by-side.

16. The intake manifold according to claim 14, wherein the outer pipe and the inner pipe are made of a synthetic resin.

17. The intake manifold according to claim 14, wherein for each manifold intake passage the at least one intake inlet comprises:

a first intake passage inlet provided on a wall surface of the inner pipe for delivering air from said surge tank into a upstream part of the at least two intake passages; and a second intake passage inlet provided on the surface of the inner pipe for delivering the air from said surge tank into a downstream part of the at least two intake passages; and the rotary valve has:

a first connecting hole for delivering the air from the surge tank into the at least two intake passages through the first intake passage inlet at a low-speed rotation of engine; and a second connecting hole for delivering the air from the surge tank into the at least two intake passages through the second intake passage inlet at a high-speed rotation of engine, whereby an actual length of the manifold intake passage is adjusted according to a rotation speed of engine.

18. The intake manifold according to claim 14, wherein the manifold intake passage has a larger air vent cross sectional dimension at a downstream portion than at an upstream portion.

* * * * *